United States Patent
Webb

[15] 3,684,015
[45] Aug. 15, 1972

[54] USE OF MICELLAR SOLUTION AS AN EMULSION BREAKER

[72] Inventor: Thomas O. Webb, Tulsa, Okla.

[73] Assignee: Marathon Oil Company, Findlay, Ohio

[22] Filed: March 16, 1970

[21] Appl. No.: 20,042

Related U.S. Application Data

[63] Continuation-in-part of Ser. No. 762,140, Sept. 24, 1968, Pat. No. 3,554,289.

[52] U.S. Cl. ............................................. 166/305 R
[51] Int. Cl. ............................................. E21b 43/25
[58] Field of Search..166/305, 274, 275; 252/8.55 B, 252/8.55 A

[56] References Cited

UNITED STATES PATENTS

| | | |
|---|---|---|
| 2,331,594 | 10/1943 | Blair, Jr. ........... 166/305 R UX |
| 2,356,205 | 8/1944 | Blair, Jr. et al. .......... 252/8.55 |
| 2,369,831 | 2/1945 | Jones et al. ............... 252/8.55 |
| 3,185,217 | 5/1965 | Brooks, Jr. et al.. 166/305 R X |
| 3,254,714 | 6/1966 | Gogarty et al. ............ 166/274 |
| 3,402,770 | 9/1968 | Messenger................. 166/305 |
| 3,554,289 | 1/1971 | Webb........................ 166/305 |

*Primary Examiner*—Stephen J. Novosad
*Attorney*—Joseph C. Herring, Richard C. Willson, Jr. and Jack L. Hummel

[57] ABSTRACT

Production of formation fluids through a well bore from a hydrocarbon-bearing subterranean formation having a water and hydrocarbon emulsion blockage surrounding the well bore is restored by injecting about 1 to about 500 gallons per vertical foot of hydrocarbon-bearing formation of micellar dispersion into the formation to "solubilize" the emulsion.

2 Claims, No Drawings

USE OF MICELLAR SOLUTION AS AN EMULSION BREAKER

CROSS REFERENCE TO RELATED APPLICATION

This application is a continuation-in-part of my copending application, Ser. No. 762,140, filed Sept. 24, 1968, now U.S. Pat. No. 3,554,289.

BACKGROUND OF THE INVENTION

1. Field of the Invention

This invention relates to removing water/hydrocarbon emulsion blocks from a producing well by solubilizing the emulsion with a micellar dispersion containing hydrocarbon, aqueous medium and surfactant.

2. Description of the Prior Art

Production of oil and gas wells often experiences a sudden or gradual decrease in the production of hydrocarbon. In some cases, the hydrocarbon production may stop altogether. Such can be caused by an emulsion block in the hydrocarbon-bearing formation, i.e. a viscous emulsion of water and hydrocarbon is formed around the well bore and adversely affects the advance of hydrocarbon to the well bore.

The prior art teaches that surfactants suspended in a carrier, such is crude oil or water, are useful to overcome the emulsion blockage. Such a process has proved satisfactory in many cases.

In some cases, blockage is characteristic of a "oneway emulsion blockage", i.e. fluid can be pumped without difficulty into the formation but when the formation is restored to production, the well will not produce. The so-called "native emulsion" is sometimes characteristic of this phenomenom.

Applicant has discovered that emulsion blockage in the formation can be removed by injecting a sufficient amount of a micellar dispersion into the formation to "solubilize" the emulsion. Once the emulsion is "solubized", the formation is returned to production. Increases in hydrocarbon production are realized. The term "solubilization" as used herein is broadly but not specifically meant to include take-up or partial take-up of the emulsion by emulsification or sorption by the micellar dispersion to substantially overcome the adversity imparted by the emulsion to the flow of hydrocarbon within the formation.

DESCRIPTION OF THE INVENTION

The term "micellar dispersion" as used herein is meant to include micellar solutions, microemulsions, "transparent" emulsions (Blair, Jr. et al, U.S. Pat. No. 2,356,205), aqueous soluble oils and micellar solution technology taught in C. G. Sumner, Clayton's *The Theory of Emulsions and Their Technical Treatment*, 5th Edition, pp. 315–320(1954). Specific examples of useful micellar solutions include those defined in U.S. Pat. Nos. 3,254,714 and 3,275,075 to Gogarty et al; 3,307,628 to Sena and U.S. Pat. No. 3,497,006 to Jones et al. Micellar dispersions differ in many ways from emulsions, basically the micellar dispersion is thermodynamically stable and generally transparent whereas emulsions are not thermodynamically stable systems and are generally opaque.

The micellar dispersion is composed of hydrocarbon, aqueous medium, and surfactant. Cosurfactant(s) and electrolyte(s) can optionally be incorporated within the micellar dispersion. Examples of volume amounts include about 4 percent to about 80 percent or more of hydrocarbon, about 10 percent to about 95 percent aqueous medium, at least about 4 percent surfactant, about 0.01 to about 20 percent cosurfactant (also identified as cosolubilizer and semi-polar organic compound), and about 0.001 to about 5 percent or more (weight percent based on aqueous medium) of electrolyte. The micellar dispersion contains at least about 5 percent aqueous medium.

The micellar dispersion can be oil-external or water-external. Where the emulsion blockage is oil-external, it is preferred to use an oil-external micellar dispersion. However, where the emulsion blockage is water-external, a water-external micellar dispersion can be effectively used.

Examples of hydrocarbon useful in the micellar dispersion include crude oil, partially refined fractions of crude oil, refined fractions of crude oil, synthesized hydrocarbons, etc. Specific examples of such hydrocarbons include side cuts form crude columns, crude column overheads, gas oils, kerosenes, heavy naphthas, naphthas, straight-run gasoline, liquefied petroleum gases, propane, pentane, heptane, decane, dodecane, cyclohexane, aryl compounds, substituted aryl compounds, etc. Preferably, the hydrocarbon is one locally available and can be characteristic of the hydrocarbon within the particular formation being treated. Unsulfonated hydrocarbon within a petroleum sulfonate, e.g. unsulfonated gas oils, are useful as the hydrocarbon.

The aqueous medium can be soft, brackish, or brine water. When the aqueous medium contains ions, it is preferred that these ions be compatible or characteristic of the ions within the formation fluids.

Useful surfactants within the micellar dispersion include nonionic, cationic and anionic surfactants. Specific examples include those surfactants taught in U.S. Pat. No. 3,497,006 to Jones et al. Preferably, the surfactant is a petroleum sulfonate, also known as alkyl aryl naphthenic sulfonate. A particularly useful sulfonate is a monovalent cation containing sulfonate, e.g. sodium and ammonium petroleum sulfonate. Preferably the petroleum sulfonate has an average equivalent weight within the range of about 350 to about 525 and more preferably about 390 to about 460. The surfactant can be a mixture of two or more of low, medium, and high average equivalent weight sulfonates or a mixture of two or more different surfactants.

The cosurfactant useful with this invention includes alcohols, amides, amino compounds, esters, aldehydes, ketones, and like materials containing from 1 to about 20 or more carbon atoms. Preferably, the cosurfactant contains about 3 to about 16 carbon atoms. Specific examples include alcohols such as isopropanol, n- and iso-butanol, amyl alcohols such as n-amyl alcohol, 1and 2-hexanol, 1-and 2-octanol, decyl alcohols, dodecyl alcohols, etc., and alkaryl alcohols such as p-nonylphenol, alcoholic liquors such as fusel oil, compounds such as 2-butoxy-ethanol and like materials. Preferably, the cosurfactant is present in volume amounts of about 0.1 to about 5 percent. Mixtures of two or more cosurfactants are also useful.

Electrolytes useful within the micellar dispersion include inorganic salts, inorganic acids, inorganic bases, organic acids, organic bases and organic salts. Preferably, the electrolyte is compatible with the ions within the formation fluids. Specific examples of electrolytes include sodium hydroxide, sodium chloride, sodium sulfate, hydrochloric acid, sulfuric acid, and electrolytes taught in U.S. Pat. Nos. 3,330,343 to Tosch et al. and 3,297,084 to Gogarty et al. Additionally, the electrolyte can be the salts or ions within the aqueous medium, e.g. within brine or brackish water. The type and concentration of electrolyte will depend on the aqueous medium, surfactant, cosurfactant, hydrocarbon, and the reservoir conditions, including temperature of the reservoir.

When the emulsion blockage contains a high ionic content, it is preferred that the micellar dispersion be designed to have a high affinity for brine. For example, the micellar dispersion can be designed with a lower average equivalent weight surfactant and/or a minimum amount of electrolyte—such can impart to the micellar dispersion a high brine affinity or a high "-solubilization" potential for an emulsion containing a high brine content. Also, where the emulsion blockage is water-external, it may be desirable to design the micellar dispersion to be more water-like in character and to have a high affinity for the emulsion. However, where the emulsion blockage is oil-external, it may be desired to design the micellar dispersion to have a high affinity for hydrocarbon and thus the components within the micellar dispersion are chosen to impart a more oleophilic character to the micellar dispersion.

The amount of micellar dispersion injected into the formation should be sufficient to "solubilize" substantially the emulsion causing the emulsion blockage. Certain factors which will determine the amount of micellar dispersion injected include: (1) the permeability of the formation (where the formation is less permeable, it may be desired to inject more of the micellar dispersion),(2) porosity, i.e. where the porosity is large, a larger amount of micellar dispersion is required, etc. However, a volume about equal to or in excess of he volume of emulsion is about the maximum amount of micellar dispersion useful with the invention, from an economical basis. Generally, about 1 to about 500 gallons per vertical foot of hydrocarbon-bearing formation is useful to solubilize the emulsion.

After the micellar dispersion is injected into the formation, it is permitted to remain in contact for a sufficient period of time to solubilize the emulsion. Such time will vary with the particular formation, the volume and character of the emulsion, and the character of the micellar dispersion being injected. Examples of times include about 0.5 to about 24 hours.

Thereafter, the well is permitted to produce the formation fluids through the well bore. In restoring the well to production, the solubilized emulsion will be backflowed and thus removed uphole.

It is intended hat the invention not be limited by the specific embodiments taught herein. Rather, all equivalents obvious to those skilled in the art are intended to be incorporated within the scope of this invention as defined within the specification and appended claims.

What is claimed is:

1. A method of restoring production of formation fluids from a hydrocarbon-bearing subterranean formation having a well bore penetrating the formation and wherein the formation is blocked by a water and hydrocarbon emulsion surrounding the well bore, the method comprising:
    1. injecting into the formation about 1 to about 500 gallons per vertical foot of hydrocarbon-bearing formation of a micellar dispersion comprised of hydrocarbon, aqueous medium, petroleum sulfonate having an average equivalent weight within the range of about 390 to about 460, electrolyte, and cosurfactant,
    2. permitting the micellar dispersion to remain in the formation to substantially solubilize the emulsion, and
    3. returning the well to production to permit the formation fluids to flow to the well bore.

2. The method of claim 1 wherein the micellar dispersion is oil-external.

* * * * *